(12) United States Patent
Dixon

(10) Patent No.: US 7,389,020 B2
(45) Date of Patent: Jun. 17, 2008

(54) LIGHT PIPE ASSEMBLY

(75) Inventor: Mark Edward Dixon, Farmington Hills, MI (US)

(73) Assignee: Intier Automotive Inc., Newmarket (CA)

(*) Notice: Subject to any disclaimer, the term of this patent is extended or adjusted under 35 U.S.C. 154(b) by 32 days.

(21) Appl. No.: 11/321,236

(22) Filed: Dec. 29, 2005

(65) Prior Publication Data

US 2006/0171632 A1 Aug. 3, 2006

Related U.S. Application Data

(60) Provisional application No. 60/648,096, filed on Jan. 28, 2005.

(51) Int. Cl.
G02B 6/02 (2006.01)
G02B 6/26 (2006.01)
G02B 6/32 (2006.01)
G02B 6/34 (2006.01)
G02B 6/42 (2006.01)
G02B 6/44 (2006.01)

(52) U.S. Cl. ............................ 385/33; 385/15; 385/31; 385/36; 385/37; 385/39; 385/100; 385/123

(58) Field of Classification Search ................. 385/33, 385/15, 31, 36, 37, 39, 100, 123
See application file for complete search history.

(56) References Cited

U.S. PATENT DOCUMENTS

| | | | |
|---|---|---|---|
| 3,497,981 A | 3/1970 | Tyne | |
| 4,422,719 A | 12/1983 | Orcutt | |
| 4,539,251 A | 9/1985 | Sugisawa et al. | |
| 4,726,989 A | 2/1988 | Mrozinski | |
| 4,733,332 A | 3/1988 | Yamashita et al. | |
| 4,867,881 A | 9/1989 | Kinzer | |
| 5,027,259 A | 6/1991 | Chujko | |
| 5,363,470 A | 11/1994 | Wortman | |
| 5,416,608 A | 5/1995 | Ueda et al. | |
| 5,420,761 A | 5/1995 | DuNah et al. | |
| 5,432,876 A | 7/1995 | Appeldorn et al. | |

(Continued)

FOREIGN PATENT DOCUMENTS

EP 0 534 140 A1 3/1993

(Continued)

OTHER PUBLICATIONS

US 6,419,383, 07/2002, Lundin (withdrawn)

*Primary Examiner*—Frank G. Font
*Assistant Examiner*—Jerry Martin Blevins
(74) *Attorney, Agent, or Firm*—Honigman Miller Schwartz and Cohn LLP

(57) ABSTRACT

A light pipe assembly providing a light pipe that has at least one transmission region, at least one light source that is optically connected to the transmission region, and an modifying element. The modifying element creates the appearance of even light distribution throughout the length of the light pipe. Thus, the modifying element blocks more light at the portion of the light pipe where the light from the light source is most intense. The modifying element is a gradient on the exterior side of the light pipe, a gradient on a secondary element that covers the light pipe, or a skin which the light pipe is at least partially imbedded in.

24 Claims, 7 Drawing Sheets

U.S. PATENT DOCUMENTS

| | | |
|---|---|---|
| 5,537,297 A | 7/1996 | Ghandehari |
| 5,542,017 A | 7/1996 | Koike |
| 5,631,994 A | 5/1997 | Appeldorn et al. |
| 5,706,065 A | 1/1998 | Yano |
| 5,710,856 A | 1/1998 | Ishii et al. |
| 5,744,534 A | 4/1998 | Ishiharada et al. |
| 5,744,543 A | 4/1998 | Huver et al. |
| 5,799,124 A | 8/1998 | Zorn et al. |
| 5,926,601 A * | 7/1999 | Tai et al. .................... 385/146 |
| 5,982,969 A | 11/1999 | Sugiyama et al. |
| 5,999,685 A | 12/1999 | Goto et al. |
| 6,123,442 A | 9/2000 | Freier et al. |
| 6,318,863 B1 * | 11/2001 | Tiao et al. .................... 353/31 |
| 6,445,504 B1 | 9/2002 | Suga et al. |
| 6,481,882 B1 | 11/2002 | Pojar |
| 6,657,683 B2 | 12/2003 | Richard |
| 6,769,799 B2 | 8/2004 | Goto et al. |
| 6,827,457 B2 | 12/2004 | Umemoto et al. |
| 6,863,428 B2 | 3/2005 | Lundin |
| 2005/0019701 A1 | 1/2005 | Chen |
| 2005/0052882 A1 | 3/2005 | Lath |

FOREIGN PATENT DOCUMENTS

| | | |
|---|---|---|
| EP | 0 590 511 A1 | 4/1994 |
| EP | 0 594 089 A1 | 4/1994 |
| WO | WO 95/16877 A1 | 6/1995 |
| WO | WO 97/08571 A1 | 3/1997 |
| WO | WO 97/38263 A1 | 10/1997 |
| WO | WO 98/20279 A1 | 5/1998 |
| WO | WO 00/50808 A1 | 8/2000 |
| WO | WO 2005/026779 A1 | 3/2005 |
| WO | WO 2005/050298 A1 | 6/2005 |
| WO | WO 2005/088367 A1 | 9/2005 |

* cited by examiner

LIGHT PIPE ASSEMBLY

CROSS-REFERENCE TO RELATED APPLICATIONS

This application claims the benefit of U.S. Provisional Application No. 60/648,096, filed Jan. 28, 2005.

FIELD OF THE INVENTION

The present invention relates to the appearance of even illumination across the length of a light pipe.

BACKGROUND OF THE INVENTION

Light pipes are conventionally used in various lighting applications. One application utilizes light pipe technology in the form of fiber optics to facilitate ambient lighting. For example, such lighting techniques may be integrated into a vehicular setting. Traditionally, automobile manufacturers have incorporated incandescent, halogen, and the other light bulbs to illuminate the vehicle interior, such as with dome lights, map lights, and the like. However, the additional bulbs often add cost, weight and other assorted difficulties in packing the additional components.

Another use for fiber optic cabling includes transferring visual and non-visual information or indicia from a point of transmission to an intended destination. Transmission of light by light pipes, however, is not without limitations as it is not one hundred percent efficient. Several reasons for this inefficiency include, without limitation, absorption by the core and the cladding that extends around the core. This is due to the presence of impurities and other phenomenon. Another reason is due to the leaking of light from the cladding. As light reflects off the interface between the cladding and the core, the light actually travels for a short distance within the cladding before being reflected back into the core. Such a phenomenon leads to attenuation of the light.

As competition increases and vehicle manufacturers vie for customers, some vehicle manufacturers have begun to consider incorporating added features into vehicles as selling points. For example, some vehicles currently offer liquid crystal displays ("LCD") and movie playing devices, such as digital videodisk players ("DVD"). Thus, it would be advantageous to integrate light pipe technology, such as ambient lighting, into vehicles.

Therefore, it is desired to address the disadvantages that arise as a result of using such technology, including without limitation, loss due to signal attenuation. Thus, it would be desirable to develop a light pipe that gave the appearance of even light distribution along the length of the pipe, which would improve the aesthetics of the light pipe, and the object it is attached to, such as a car.

SUMMARY OF THE INVENTION

The present invention relates to a light pipe assembly where the light pipe has at least one transmission region, at least one light source that is optically connected to the transmission region, and a modifying element. The modifying element is optically connected to the light pipe so that the modifying element creates the appearance of even light distribution throughout the length of the light pipe. Thus, the modifying element blocks the portion of the light pipe where the light from the light source is most intense. The modifying element blocks the light in order to give the appearance that the portion of the light pipe closest to the light source is being illuminated with the same amount of light intensity as portions of the light pipe that are farther away from the light source.

The modifying element can be a modification of the exterior surface of the light pipe in order to distort the light, a secondary lens that is placed over the light pipe, or a substrate that the light pipe is imbedded in. No matter what the form of the modifying element takes, it is preferred that the concentration of the modifying element varies in concentration as it extends away from the light source. Thus, if modifying element is on the surface of the light pipe as a secondary lens the modifying element is a gradient, and if the light pipe is imbedded in the substrate, the modifying element is the portion of the substrate that blocks the light pipe.

In an alternate embodiment, the light pipe can have multiple light sources on a single end or both ends of the light pipe. Thus, one light source can be optically connected to a transmission region that is on the center axis of the light pipe, while the second light source is optically connected to a transmission region that is off the center axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
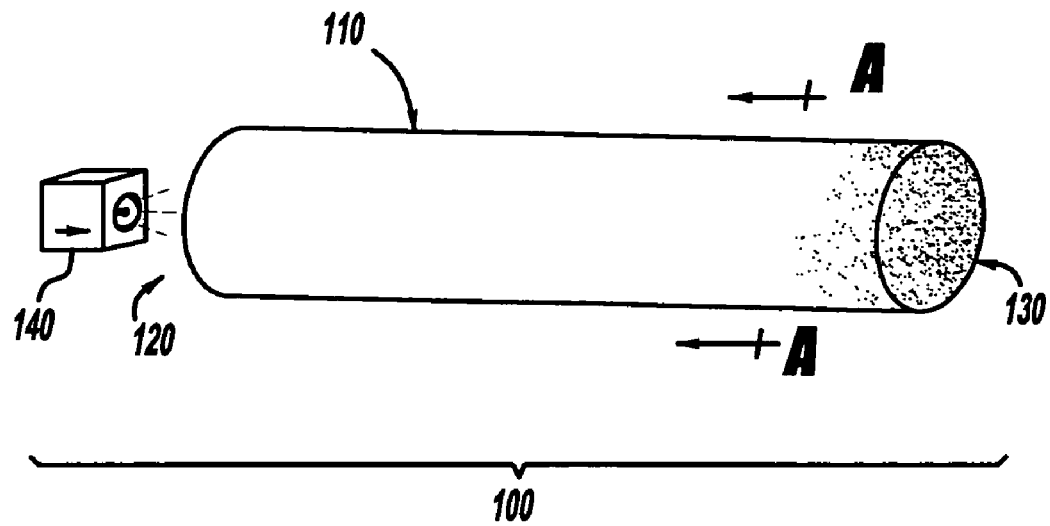
FIG. 1 is a perspective view of a light pipe assembly in accordance with the natural state of light attenuation.

FIGS. 1-5 refer to examples of light pipe assemblies and configurations which may be utilized in teaching the present invention. Referring to FIG. 1, a general light pipe assembly 100 is shown and described according to the prior art. The light pipe assembly 100 includes a light pipe 110 having a first end 120 and a second end 130, and a light source 140. The light source 140 is located at the first end 120 of the light pipe 110. Various coupling devices are known to connect the light source 140 to the light pipe 110 and result in a minimal degree of loss that may result from light refracting or reflecting off the interface created therebetween. Therefore, any means of connection between the light pipes 110 and the light source 140 can be used, but it is preferred that the means of connection that is used limits the amount of light refracting or reflecting.

Figure 2:
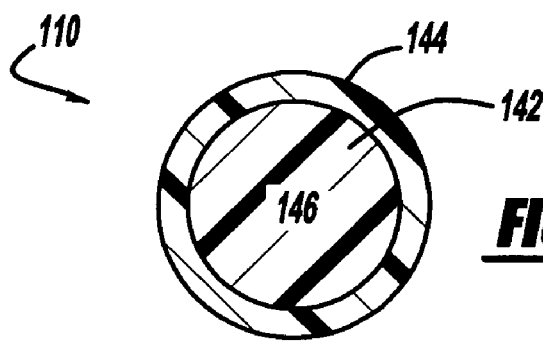
FIG. 2 is a cross sectional view of a light pipe taken along line A-A of FIG. 1.

Referring now to FIG. 2, the light pipe 110 comprises an optic core 142 and an optic cladding 144. The optic core 142 is the light carrying element at the center of the light pipe 110. The optic core 142 includes a transmission region 146. The optic core 142 is made from a combination of highly purified silica and germania, and the cladding 144 is made of pure silica. Therefore, the combination of the material for the optic core 142 and the cladding 144 create an extremely reflective surface at the interface between the optic core 142 and the cladding 144. This result is referred to as total internal reflection. Light entering the optic core 142 reflects off the interface between the optic core 142 and remains within the optic core 142.

The light pipe assembly 100 includes any combination of a buffer (not shown), a strength member (not shown), and a protective jacket (not shown) that surround the optic core 142 and the cladding 144. The buffer acts as a shock absorber and the strength member adds tensile strength to prevent the light pipe 110 from pulling forces that may, for example, result during installation. The protective jacket protects the light pipe 110 from abrasion, environmental damages, and any other element that may cause damage to the light pipe 110.

Moreover, the light pipe 110 can be a single-mode or a multi-mode fiber optic cable. A multi-mode cable can carry multiple signals and resist loss or attenuation of the signal as it travels down the cable. A single-mode cable generally has a significantly smaller diameter than multi-mode cable. When light travels down a multi-mode cable, it is reflected at different angles as it propagates down the transmission path. These multiple reflections cause the light to spread out in time, or length, as it propagates down the fiber. A single-mode cable, typically being narrower than a multi-mode cable, confines the optical signal to a straighter path with fewer reflections. As a result, optical signal dispersion is significantly reduced, which translates into a clearer signal. Therefore, the length of a single-mode cable can be longer than the cable length of a multi-mode cable.

The light pipe 110 has a circular cross-sectional shape and a relatively large diameter. However, the light pipe 110 can be any desired shape and size. Also, the light pipe 110 may be a single cable or a plurality of cables bundled together to form a single cable.

Referring to FIG. 1, the light source 140 is arranged to transmit light (A) to the first end 120 of the light pipe 110. Examples of the light source 140 could include, without limitation, a light emitting diode ("LED"), a diode laser, or a conventional incandescent lamp. The emitted light, as indicated by the star bursts, illuminates a designated area within the light pipe 110. The light source 140 may generate either visual or non-visual light or both. For purposes of convenience, the present disclosure generically refers to both types of light as light, and, therefore the term light includes visual and non-visual light.

Figure 3:
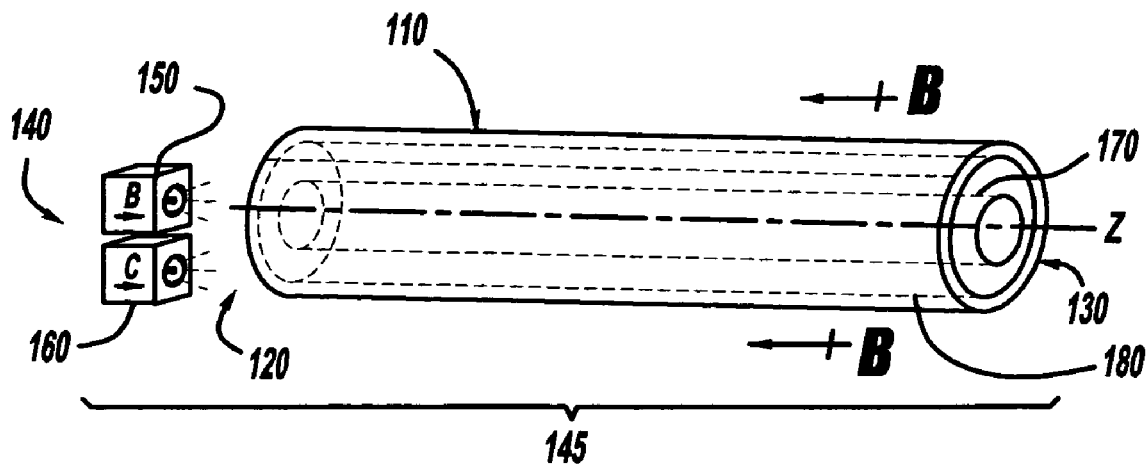
FIG. 3 is a perspective view of a light pipe assembly using multiple light sources at the same end of the light pipe.
Figure 4:
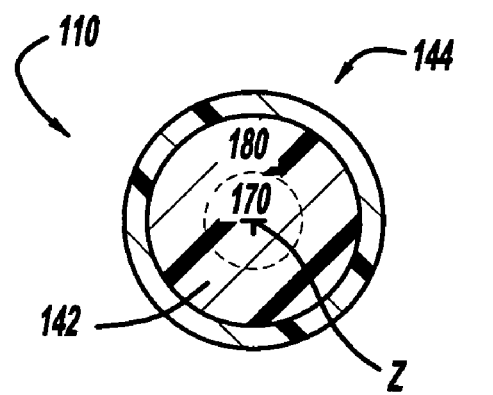
FIG. 4 is a cross sectional view of the light pipe taken along line B-B of FIG. 3.

Referring to FIGS. 3 and 4, the light pipe assembly 110 is shown having multiple light sources 140, 150. The light source 140 has a first light emitting device 150 and a second light emitting device 160. The first light emitting device 150 propagates light (B) down a first transmission region 170 of the light pipe 110, which is along the center axis (Z) of the core 142. The second light emitting device 160 propagates a second light (C) down a second transmission region 180 in the light pipe 110, which is off the center axis (Z) of light pipe 110. However, either or none of the light sources 150, 160 can be optically connected to the center axis (Z).

Forms of electromagnetic radiation, such as light, have different wavelengths which result in very limited or no interference in an environment where no light attenuation diminishes the intensity of the light. Thus, the light waves may coexist without losing their respective properties as they propagate through the light pipe 110.

The first light transmission region 170 carries light from the first light emitting device 150 that has a first wavelength $\lambda_1$, and a related first frequency $f_1$ and the second light transmission region 180 carries light from the second light emitting device 160 that has a second wavelength $\lambda_2$ and a related second frequency $f_2$. In a preferred embodiment, the light pipe assembly 110 is configured to transmit a plurality of frequencies. For example, if the light pipe assembly 110 has two frequencies, the first frequency will extend along the first transmission region 170, and the second frequency will extend along the second transmission region 180. Any number of frequencies can be used, such that they correspond with any number of transmission regions.

The first light emitting device 150 is configured to propagate light from the visible light spectrum, and the second emitting device 160 is configured to propagate light from the non-visible spectrum. The subsequent arrangement of the light sources depends on the intended use of the system. Thus, propagating light through the first transmission region 170 of light pipe 110 will generally result in less attenuation or energy loss then propagating the same light through the second transmission region 180. Therefore, a primary light is arranged through the first transmission region 170 and a light signal is arranged through the second transmission region 180.

Propagating a light signal down the center axis (Z) of the light pipe 110 results in the least amount of loss when compared to a light signal being propagated through a transmission region that is off the center axis (Z). Therefore, as light is propagated farther from the center axis (Z), a higher degree of loss results.

As described in a preferred embodiment above, the first light emitting device 150 carries the visible light and the second light emitting device 160 carries the non-visible light. The first light emitting device 150 is arranged on the center axis (Z) and leads to the visible light passing through the light pipe 110 with lower loss than the non-visible light passing through the light pipe 110.

Figure 5:
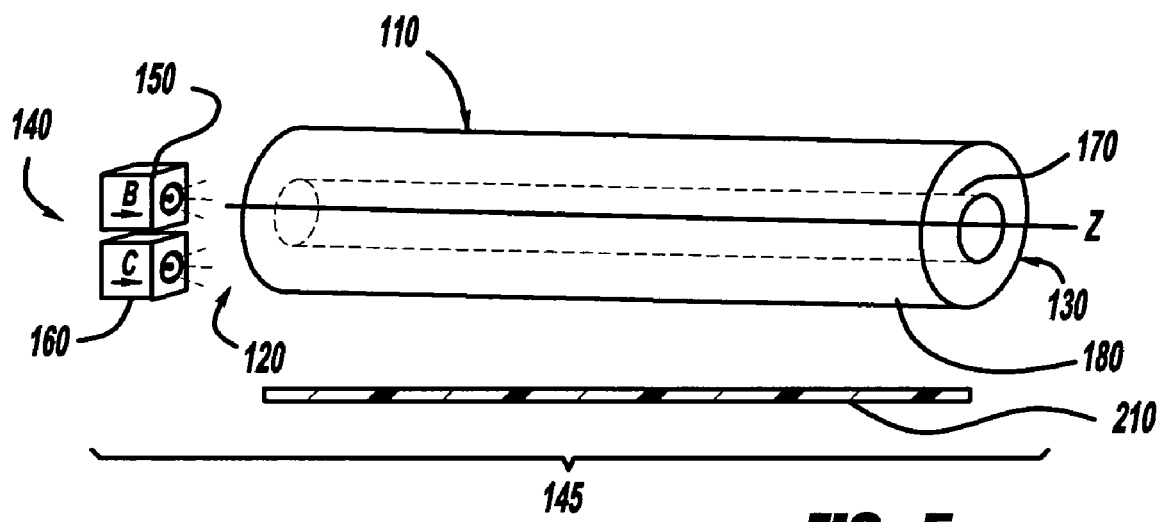
FIG. 5 is a perspective view of a light pipe assembly using a phosphorescent material.

Referring now to FIG. 5, the light assembly 100 is shown wherein a phosphorescent material 210 is illuminated. The single light pipe 110 is used to carry both non-visible light and visible light. The non-visible light is configured to illuminate phosphorescent material 210 which extends along the length of the light pipe 110. The wavelength of the non-visible light is at or between the violet/ultra-violet ranges based upon the characteristics of the phosphorescent material 210. Thus, the phosphorescent material 210 illuminates under the light pipe 110, giving the appearance of another light source which can also display, for example but not limited to, writing or logos.

The phosphorescent material 210 is arranged along the length of the light pipe 110. The second emitting device 160 propagates the second light (C) off-axis and in the second transmission region 180. That is, it is beneficial to arrange the ultra-violet light in the second transmission region 180 when the use of the non-visible light is secondary to the use of the visible light, as the second transmission region is less efficient than the first transmission region 170.

When both light sources 150, 160 employ two visible colors, the color that has the longer wavelength is preferably generally arranged in the second transmission region 180 since longer wavelengths will generally result in a lower loss or attenuation through the light pipe 100 than shorter wavelengths in the same environment. It is noted, however, that the present invention contemplates any arrangement of light, and therefore includes any dual use of a first transmission region for transferring a primary light source and a second transmission region for transferring a secondary light source.

Light pipes 110 are conventionally used to create ambient lighting. One way for such lighting is to remove at least a portion of the outer material, such as the cladding 144, that surrounds the core 142. Other examples of materials that may also require removal are buffer, strength member, and the protective jacket. However, this list of examples is not exhaustive, and any portion of the light pipe assembly 100 can be altered to affect the emitted light. Once the material is removed and the optic core 142 is exposed, the light transferred inside the optic core 142, generated by the light source 140, is leaked out or emitted through the optic core 142 to substantially illuminate a desired area therearound (not shown).

Referring again now to FIG. 1, the light source 140 illuminates the light pipe 110 at the first end 120. The light pipe 110 depicts the light pipe 110 in its natural state where the shading shows the loss of light or the end 130 away from the light source 140. The shading on the light pipe 110 is included to highlight an illumination loss that occurs over a length of the light pipe 110. It should be noted that the illustrations and the illumination loss represented through the shading thereon are not to scale, and are therefore only included for illustration. Thus, the light pipe 110 having a very short length, may not have any perceived loss, and the light pipe 110 having a very long length may have more loss. Also, the loss may be more gradual, or more rapid than what is shown in the illustrations as many factors affect the rate of loss, including without limitation, impurities present within the core or the wavelength (or frequency) of the light passing through the optic core 162.

With regard to FIGS. 6-21, the darker shading on the light pipe 110 when the light source 140 is turned on represents a lower level (dimmer) illumination, and the lighter or absence of shading represents illumination having substantially little and no perceived loss. In general, the lowest level of illumination occurs furthest away from the light source 140. Thus, the lowest level of illumination occurs at or near the second end 130 of light pipe 110. By contrast, the darker shading on the light pipe 110 when the light source 140 is turned off represents a greater density of a modifying element, which is described in greater detail below.

There are many reasons for the light loss along the length of the light pipe 110, for example, the light loss is caused by absorption of the light by the core 142. This is due to the presence of impurities, such as water vapor. Another reason is due to the scattering of light that is caused by light bouncing off atoms or molecules in the core 142. The amount of scattering is a function of the wavelength, with longer wavelengths having lower scattering. These characteristics lead to among other things attenuation of the light.

Figure 6:
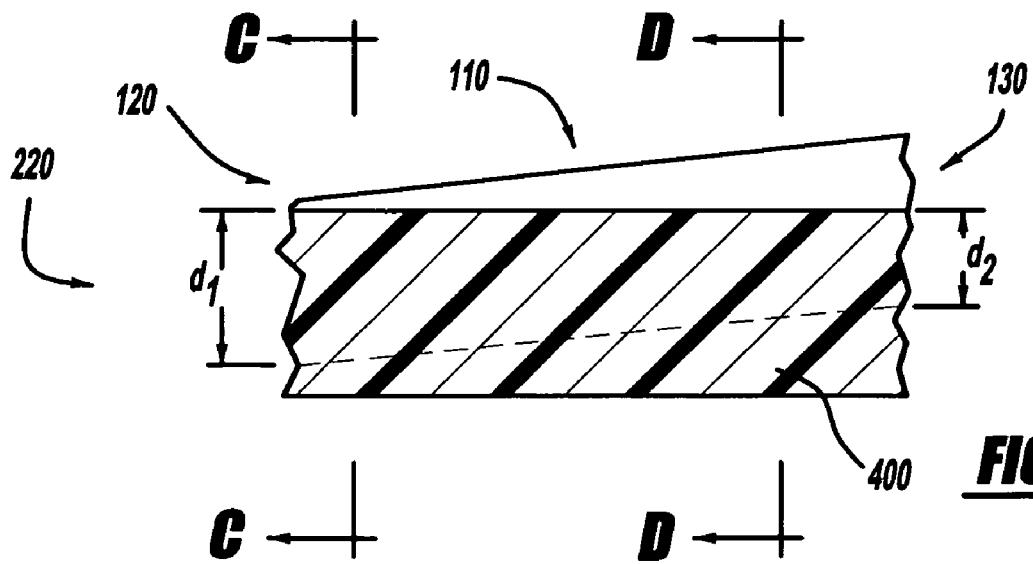
FIG. 6 is a side sectional view of the light pipe assembly imbedded in a skin at different depths in accordance with the present invention.
Figure 7:
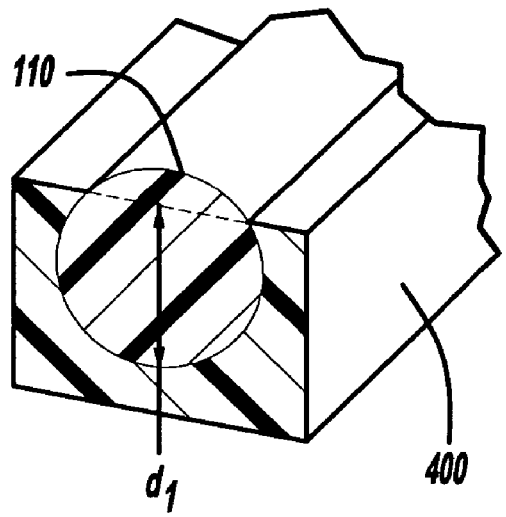
FIG. 7 is a cross sectional perspective view, partially broken away, of the light pipe of FIG. 6 taken along line C-C of FIG. 6.
Figure 8:
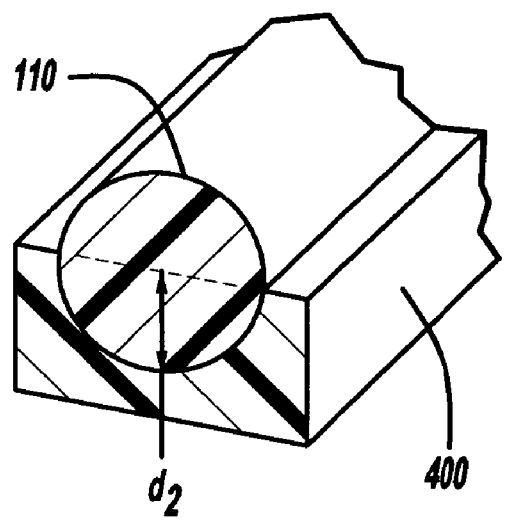
FIG. 8 is a cross sectional perspective view, partially broken away, of the light pipe of FIG. 6 taken along line D-D of FIG. 6.

The present invention utilizes the characteristics and configurations of the light pipe assemblies 100 described above to create an appearance of even light distribution along the length of the light pipe 110. Referring now to FIGS. 6-8, a method for correcting the loss of light is shown and described. The modifying element 220 is added to the light pipe assembly 100. In a preferred embodiment, the modifying element 220 comprises a skin or a substrate 400 with the light pipe 110 disposed or imbedded therein. The first end 120 is located at a first depth $d_1$ within the substrate 400, and the second end 130 is located at a second depth $d_2$ within the substrate 400, wherein the first depth $d_1$ extends below the skin farther then the second depth $d_2$. At the first depth $d_1$, only a portion of light pipe 110 is visible from a position outside the substrate 400. The light pipe 110 becomes gradually more exposed when moving away from the light source 140, as the depth gradually changes from the first depth $d_1$ to the second depth $d_2$. This arrangement facilitates the correction of the loss of light, and the ordinary observer will thereby perceive the light pipe 110 having equal illumination running the length of light pipe 110. In a preferred embodiment, the substrate 400 is multifunctional so that the substrate 400 is modified to create an appearance of even light distribution along the light pipe 110, and supports the light pipe 110 since the light pipe 110 is imbedded into the substrate 400.

Furthermore, the ordinary observer will most likely not perceive the variance in depth along the length of the light pipe 110 from $d_1$ to $d_2$. In an alternate embodiment, the light pipe 110 could be wholly or partially encapsulated by the substrate 400 at different depths. An example of the substrate 400 is an instrument panel of a vehicle in which a light pipe is imbedded during the molding process or the like. Thus, the light pipe 110 is imbedded in the instrument panel and illuminates gauges or lights in the instrument panel. For example, the light pipe 110 is used to illuminate the speedometer, a reading light, or other ambient lighting factors which improve the aesthetics of the vehicle.

Figure 9:
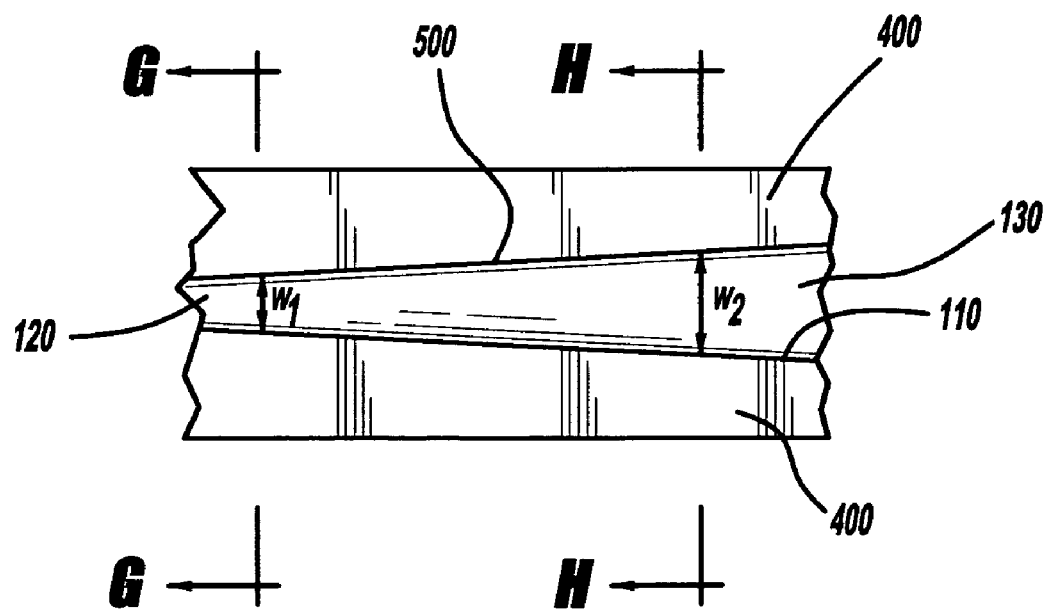
FIG. 9 is a plan view of the light pipe assembly fully encapsulated in the skin, wherein a slot has variable widths that expose the light pipe.
Figure 10:
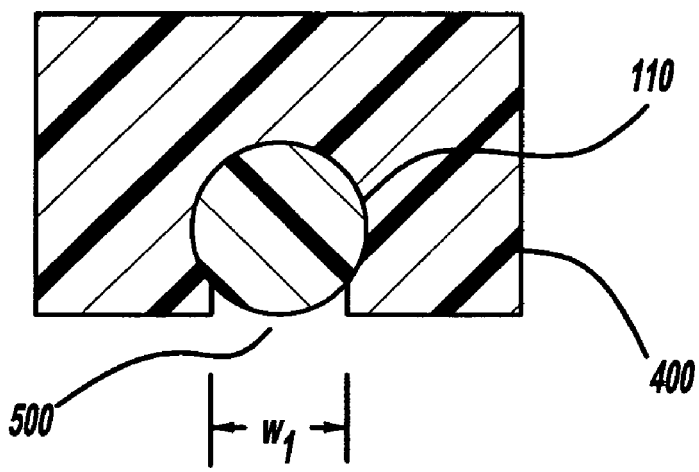
FIG. 10 is a cross sectional view of the light pipe assembly taken along the line G-G of FIG. 9, showing the size of the slot on the end closer to the light source.
Figure 11:
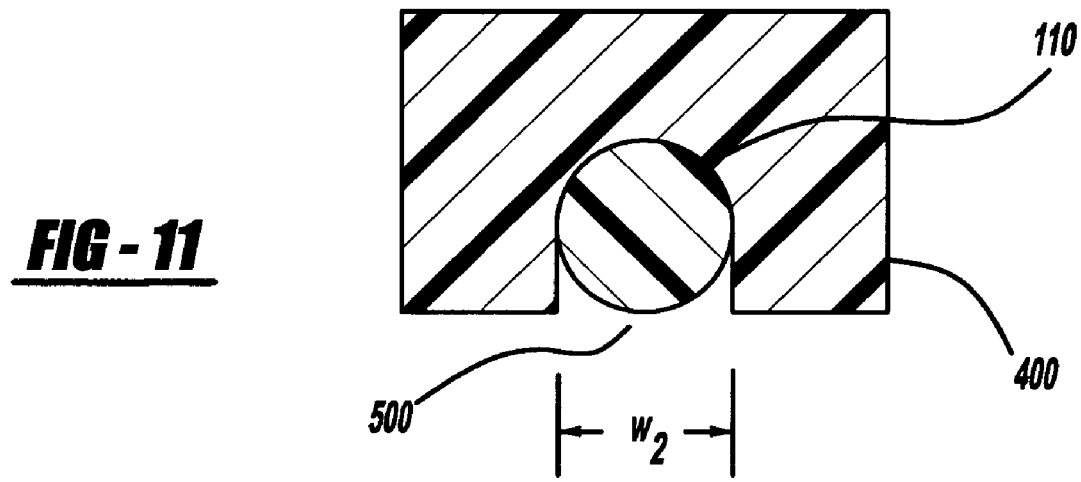
FIG. 11 is a cross sectional view of the light pipe assembly taken along the line H-H of FIG. 9, showing the size of the slot on the portion of the light pipe farther from the light source.

Referring to FIGS. 9-11, in an alternate embodiment, the modifying element 220 comprises a slot 500 in the substrate 400 which extends along the length of the light pipe 110 and is varied in size to produce an appearance of even light distribution along the length of the light pipe 110. Thus, the light pipe 110 is completely imbedded in the substrate 400. For example, the slot 500 at the first end 120 has a smaller width ($w_1$) than the width ($w_2$) of the slot 500 at the second end 130. Thus, the slot 500 at $w_1$ blocks more light from the light pipe 110 than the slot 500 at $W_2$. In a preferred embodiment, $w_1$ is at the portion of the light pipe 110 that is closest to the light source 140, and $w_2$ is at the portion of the light pipe 110 that is farthest from the light source 140. Therefore, the slot 500 blocks more light where the light intensity is greatest and the slot 500 blocks less light where the light intensity is reduced. Again, the substrate 400 is multifunctional in that the substrate 400 supports the light pipe 110 since the light pipe 110 is imbedded into the substrate 400, and the substrate 400 and the slot 500 are the modifying element 220 since the tapered slot 500 creates the appearance of even light distribution along the length of the light pipe 110.

Figure 12:
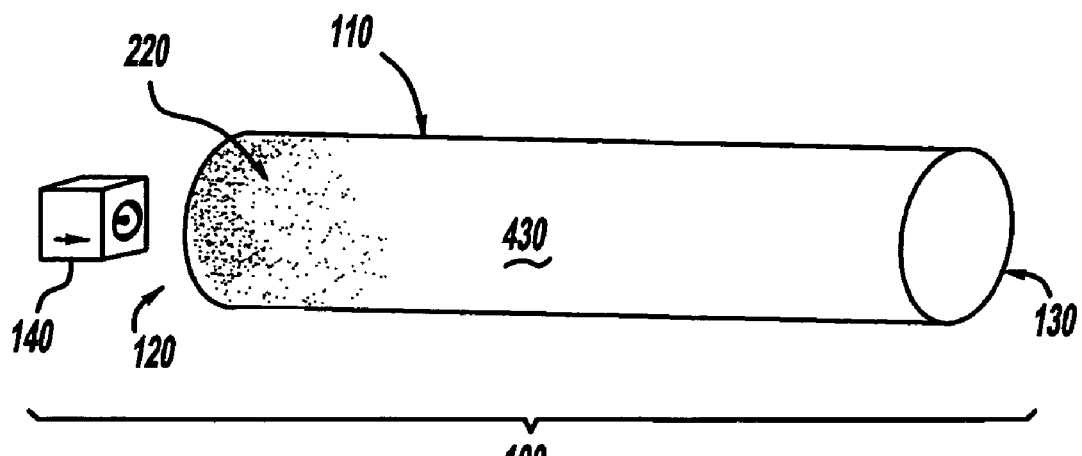
FIG. 12 is a perspective view of the light pipe assembly including the modifying element with the light source turned off in accordance with the invention.

An alternate embodiment for implementing another modifying element 220 is shown in FIG. 12 where the modifying element 220 is on the exterior surface of the light pipe 110. The light source 140 is turned off to highlight the illustration of the modifying element 220, thus, the shading depicts the density of the modifying element 220. In this embodiment, the modifying element 220 has a gradient 430 that is preferably applied along the entire length of the light pipe 110. In an alternate embodiment, the modifying element 220 covers only a portion of the light pipe 110. The gradient 430 is added to substantially control and correct the appearance of the light emitted by the light pipe 110. Where the shading appears darker, the gradient 430 is included to limit the degree of illumination that may pass from the light pipe 110 therethrough. Similarly, as the shading appears lighter, the gradient 430 allows an increased amount of illumination to pass therethrough. FIG. 12 is not drawn to scale, and the variance of the gradient 430 can be altered anywhere along the light pipe 110.

Figure 13:
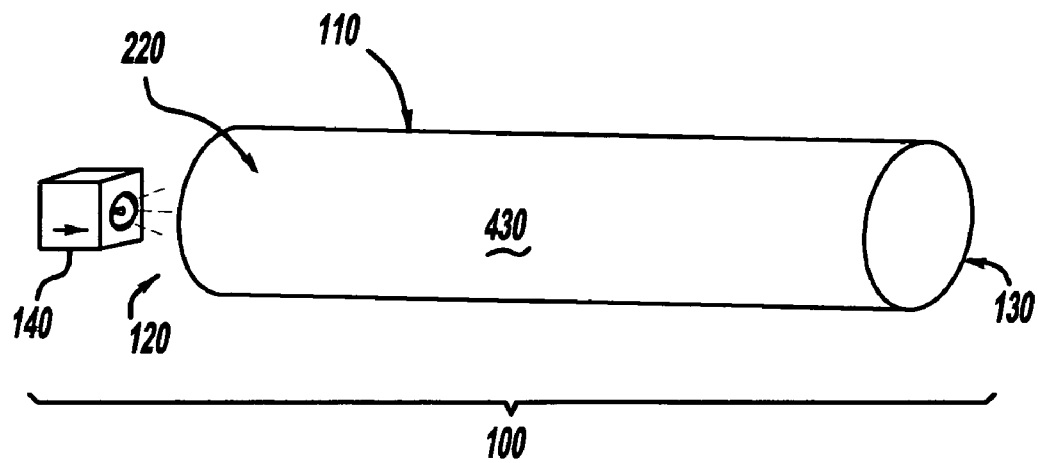
FIG. 13 is a perspective view of the light pipe assembly including a modifying element with the light source turned on in accordance with the invention.

With combined reference to FIGS. 12 and 13, FIG. 13 illustrates the illumination of light pipe 110 when the light source 140 in FIG. 12 is switched on. As such, the gradient 430 substantially equalizes the illumination along the entire length of the light pipe 110.

The gradient 430 is applied directly to the material surrounding the optic core 142 of the light pipe 110. The gradient 430 is an imperfection on the surface of the light pipe 110 which can be, for example but not limited to, an etching, laser cut, ink printing, pad printing, or screen printing. In a preferred embodiment, the surface of the gradient 430 is applied to is an exterior surface of the light pipe 110. The pattern of the gradient 430 is the most dense near the first end 120 which is closest to the light source 140, and less dense near the second end 130 which is farthest from the light source 140. Therefore, the density of the gradient 430 is inversely proportional to the amount of light loss along the length of the light pipe 110. In a preferred embodiment, a conventional or standard light pipe is used in this embodiment since the only modifications to the light pipe 110 are on the exterior of the light pipe 110 and not the interior of the light pipe 110.

Figure 14:
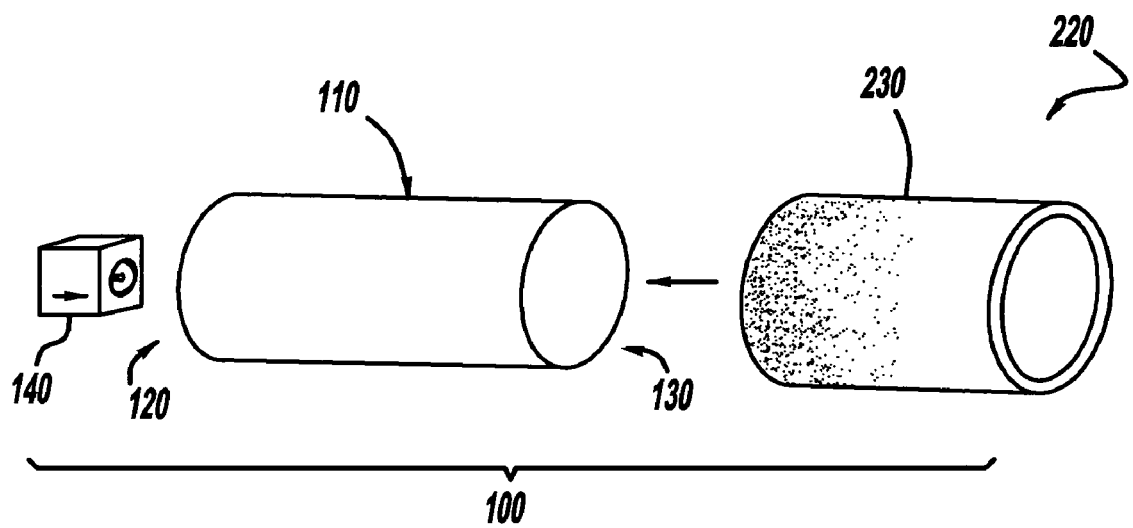
FIG. 14 is a perspective view of an alternate embodiment of the light pipe assembly including an alternate embodiment of the modifying element as a secondary piece.

An alternate embodiment is shown in FIG. 14 where the modifying element 220 is created by the gradient 430 being applied to a sheath or supplemental lens 230 rather than directly on the light pipe 110. The gradient 430 is applied to the sheath 230 in the same manner as when the gradient 430 is applied to the light pipe 430, as described above. Furthermore, in a preferred embodiment, the gradient 430 on the sheath 230 is in a similar pattern as the gradient 430 pattern that is applied directly to the light pipe 110, as described above. Thus, the gradient 430 is the most dense on the end 120 where the light source 140 is located and less dense along the length of the light pipe 110. The sheath 130 is configured to encapsulate the light pipe 110, and therefore the sheath 230 has a diameter that is just larger than a diameter of the light pipe 110 so that the light pipe 110 may pass therethrough. In this embodiment, the sheath 230 acts as a lens over the light pipe 110 and substantially controls the perceived illumination from the light pipe 110. In an alternate embodiment, the sheath 230 does not fully encapsulate the light pipe 110 and the sheath 230 only covers a portion of the light pipe 110.

Figure 15:
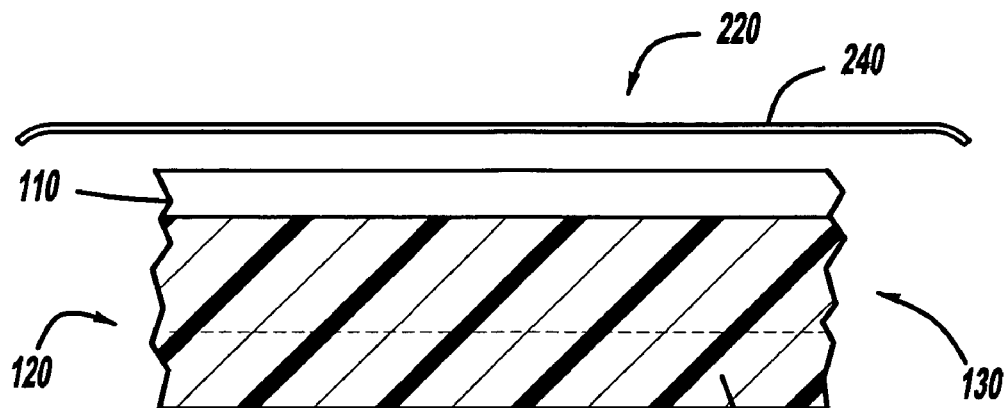
FIG. 15 is a perspective view of an alternate embodiment of the light pipe assembly wherein the modifying element is a cover that is placed over the light pipe.
Figure 16:
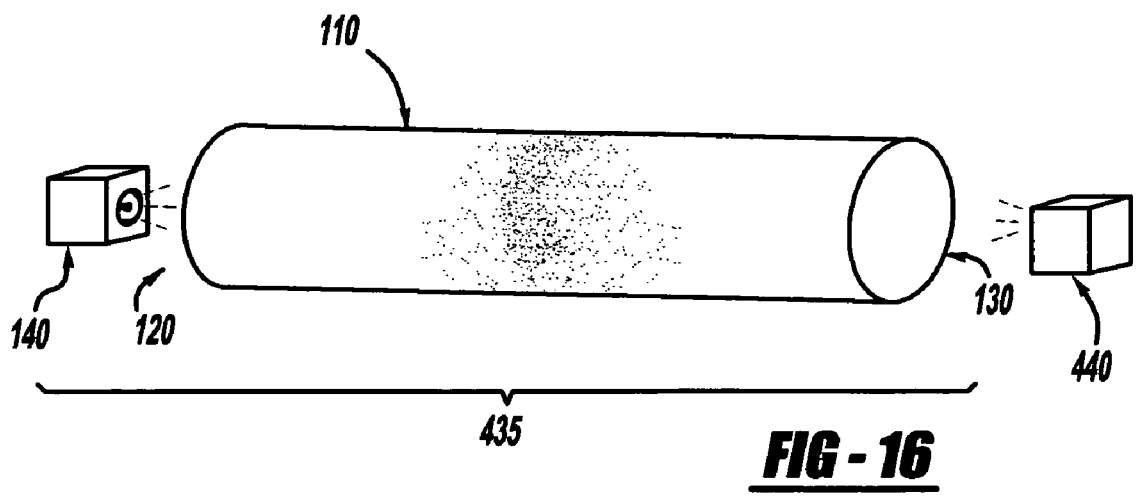
FIG. 16 is a perspective view of an alternate embodiment of the light pipe assembly using multiple light sources in accordance with the natural state of light attenuation.

FIG. 15 depicts an alternate embodiment of the modifying element 220 using a gradient 430. A cover 240 covers the light pipe 110 so that the perceived illumination is substantially similarly to the perceived illumination from the sheath 230. The cover 240 includes the gradient 430 in the same pattern as described above. In this embodiment, the cover 240 does not fully encapsulate or circumscribe the light pipe 110. Thus, the light pipe 110 is evenly imbedded in the substrate 400, and the gradient 430 on the cover 240 is distributed inversely proportional to the light loss across the length of the light pipe 110. Furthermore, in a preferred embodiment, the ends of the cover 240 are imbedded into the substrate 400 in order to secure the cover 240 to the substrate 400 and maintain the proper relationship between the light pipe 110 and the cover 240.

With reference now to FIGS. 16-21, an alternate embodiment is shown of a light pipe assembly 435. The light pipe assembly 435 includes a first light source 140 at a first end of a light pipe 110 and a second light source 440 at a second end 130 of the light pipe 110. The light sources 140, 440 are shown switched on to highlight the illumination pattern along the length of the light pipe 110. The lowest level of illumination or the point of maximum light loss occurs at or near the midpoint of the light pipe 110, due to the light experiencing its' greatest loss at this point. The point of maximum light loss can occur anywhere along the length of the light pipe 110 depending on the intensity of the light source 140, 440. Thus, if the intensity of light source 140 is greater than the intensity of light source 440, the point of maximum light loss will be on the same side of the light pipe 110 as the light source 440. In this regard, the darker shading illustrates dimmed levels of illumination and the lighter shading illustrates more illumination. Again, the shading is merely used as an example and clarification and is not illustrated to scale.

Figure 17:
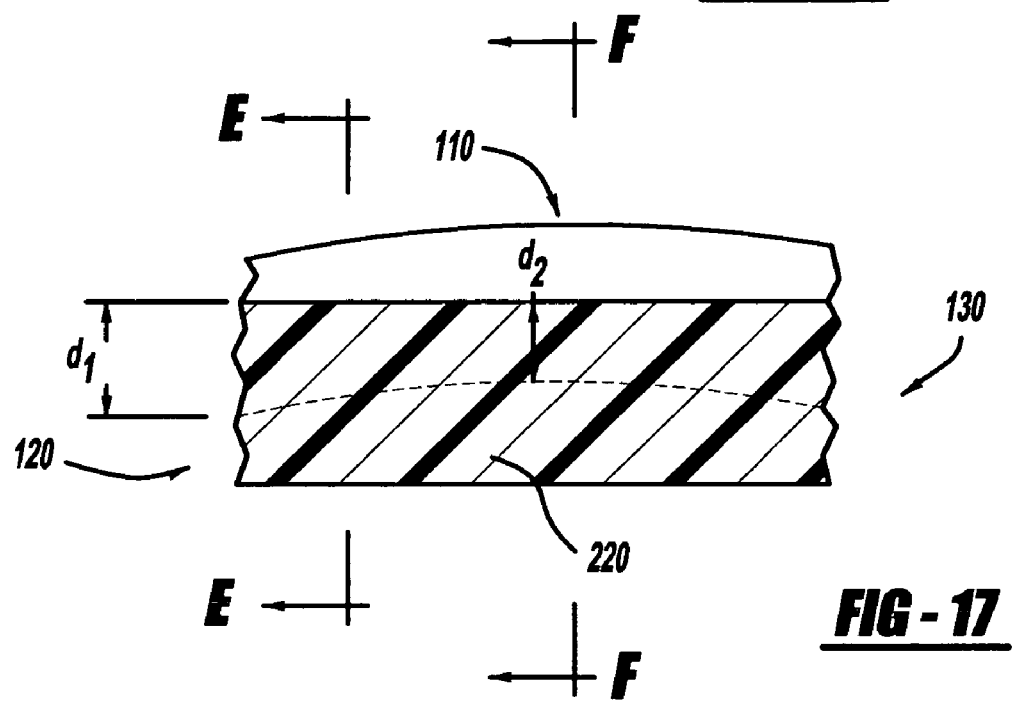
FIG. 17 is a side sectional view of the light pipe bent and imbedded in a skin in accordance with the invention.
Figure 18:
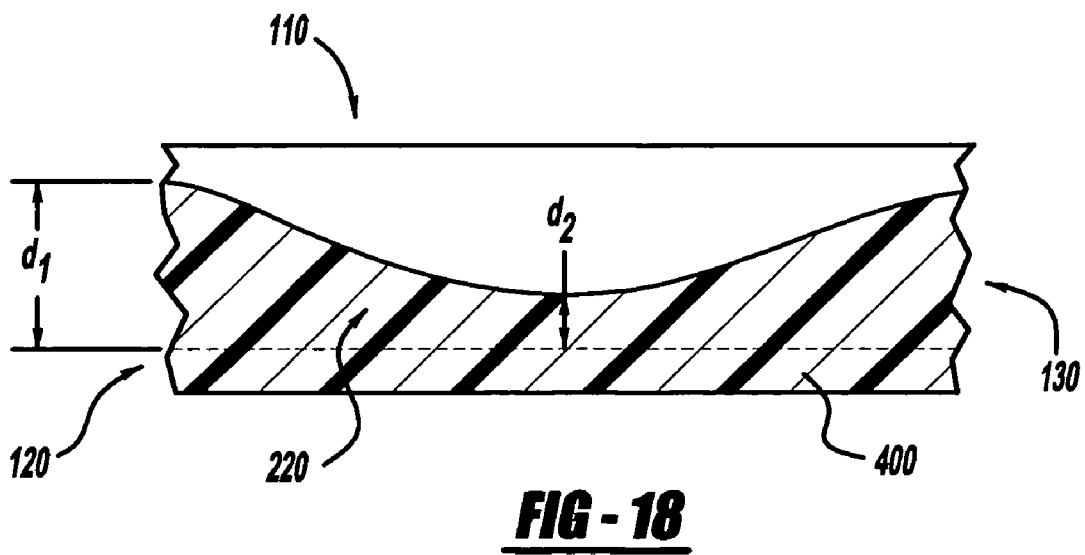
FIG. 18 is a side sectional view of an alternate embodiment of the light pipe imbedded in the skin.

Referring now to FIGS. 17 and 18, two methods of adding an modifying element 220 are shown in order to create the appearance of even light distribution along the length of the light pipe 110. The modifying element 220 is the substrate 400 which extends over the light pipe 110. In this embodiment, the first end 120 and the second end 130 of light pipe 110 are located at a first depth $d_1$ within the substrate 400, and the point of maximum light loss is located at a second depth $d_2$ within the skin. The first depth $d_1$ extends below the skin further then the second depth $d_2$. At the first depth $d_1$, only a portion of light pipe 110 is visible from a position outside the substrate 400. The light pipe 110 becomes gradually more exposed when moving away from the light sources 140, as the depth gradually changes to the second depth $d_2$. Thus, cross-section E-E is the same as FIG. 7, and cross-section F-F is the same as FIG. 8. This arrangement gives the perception of correcting the loss of light, and the ordinary observer will thereby perceive the light pipe 110 having a substantially equal illumination running the length of light pipe 110. Also, the ordinary observer will most likely not perceive the variance in depth. FIG. 17 depicts the light pipe 110 bent to facilitate this arrangement. FIG. 18 depicts an alternate embodiment where the substrate 400 is formed to vary the depth of the light pipe 110.

Figure 19:
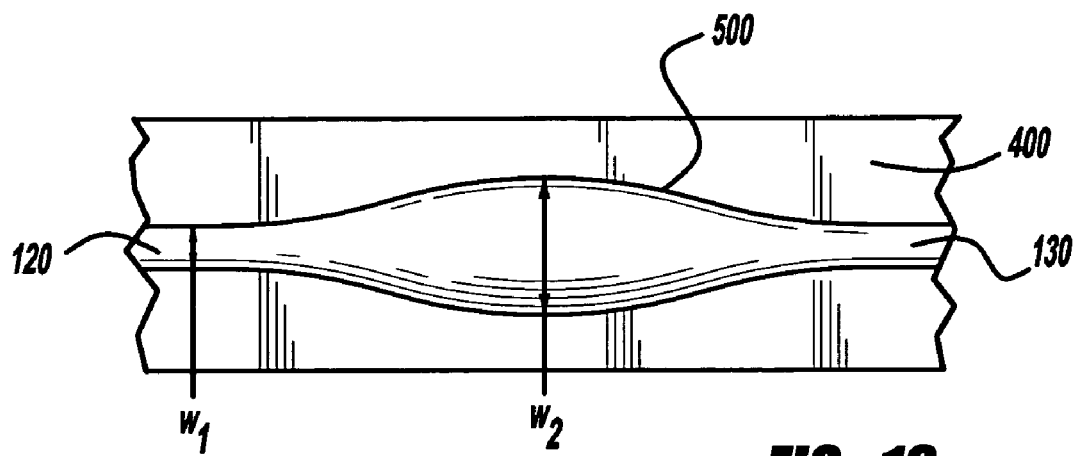
FIG. 19 is a plan view of the light pipe assembly encapsulated in a substrate and illustrating the varying width of a slot when a light source is optically connected to both ends of the light pipe.

Referring to FIG. 19, an alternate embodiment is shown using the tapered slot 500 when multiple light sources 140, 440 are placed on opposite ends 120, 130. Thus, the slot 500 is varied in size along the length of the light pipe 110 to a point of maximum light loss. For example, the width of slot 500 at the ends 120, 130 are small ($w_1$) and the width of slot 500 increases ($w_2$) as it extends along the length of the light pipe 110 to the point of maximum light loss and then the width of slot 500 reduces ($w_1$) as the slot 500 approaches the opposite end 120, 130. The point of maximum light loss can be anywhere along the length of the light pipe 110 based upon the light intensity of the light sources 140, 440. However, in either of the embodiments described above when the light pipe 110 is fully encapsulated by the substrate 400 the size of the slot 500 increases as it extends away from the light source, either but not limited to, a linear increase or an exponential increase.

By imbedding the light pipe 110 in the substrate 400 the time and cost of creating the appearance of an even light distribution in the light pipe assembly 100 is reduced. For example, the light pipe 110 does not have to be individually configured to create the appearance of even light distribution. Thus, the light pipe 110 is manufactured at a lower cost, since it comprises of off the shelf parts. Moreover, the substrate 400 does have to be configured to create the appearance of even light distribution. However, configuring this feature into the skin does not greatly increase the manufacturing time and cost because the substrate 400 is configured with other features also. For example, the substrate 400 is an instrument panel in a motor vehicle the tool used to form the instrument panel is configured with other features that are on the instrument panel. Therefore, the addition of a feature in the tool does not increase the manufacturing time and cost of the instrument panel.

Figure 20:
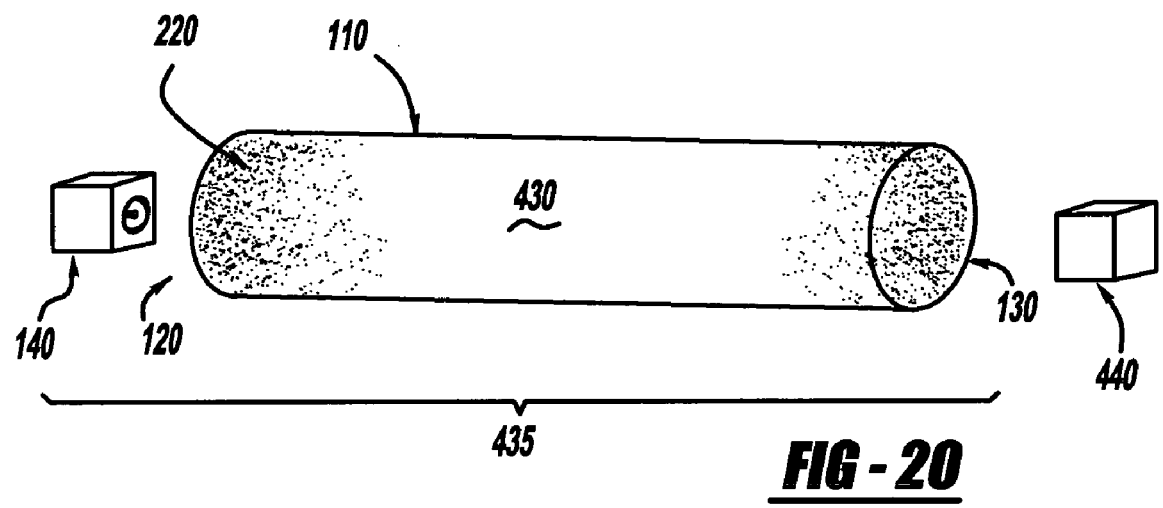
FIG. 20 is a perspective view of the light pipe assembly with light sources optically connected to both ends of the light pipe and turned off in accordance with the invention.

Referring now to FIG. 20, the light source 140 is turned off to highlight the principles of the modifying element 220. In this example, the modifying element 220 is the gradient 430 that is applied on or along the light pipe 110 and is represented by the shading. The gradient 430 is added to substantially control the appearance of the light through the light pipe 110. Where the shading appears darker, the gradient 430 is included to limit the degree of illumination that may pass from the light pipe 110 therethrough. By contrast, as the shading appears lighter, the gradient 430 allows an increased amount of illumination to pass therethrough. In an alternate embodiment, the gradient 430 may similarly be applied to a sheath (not shown) or a cover (not shown) as described above when only a single light source 140 is used.

Figure 21:
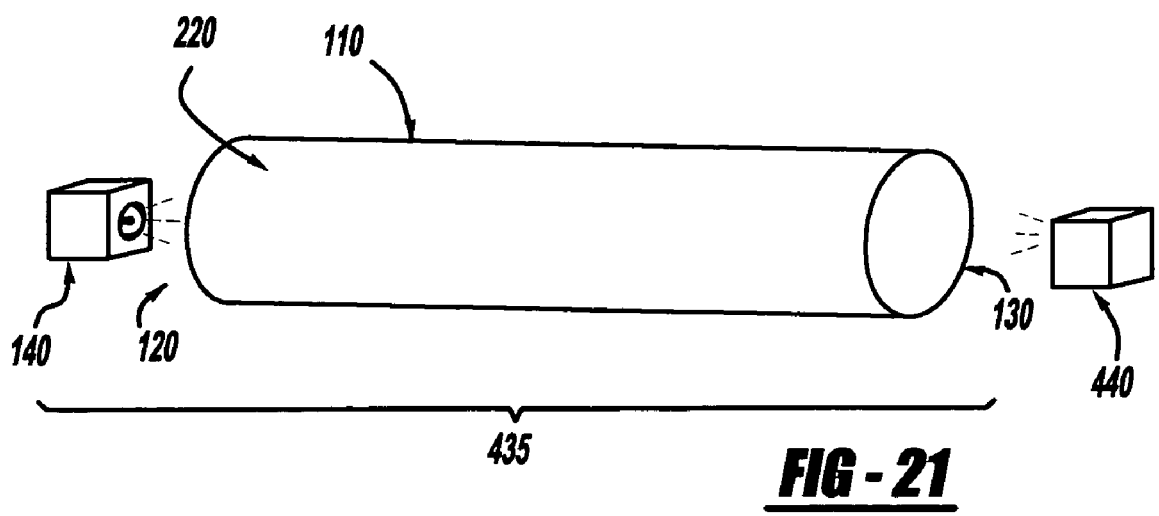
FIG. 21 is a perspective view of the light pipe assembly with the light sources turned on including the modifying element which gives the appearance of even light distribution.

With combined reference to FIGS. 20 and 21, FIG. 21 illustrates the illumination of light pipe 110 when the light source 140 is switched on. As such, the gradient 430 substantially equalizes the illumination along the length of the light pipe 110. The modifying element 220 is applied to the light pipe 110 in any of the embodiments described above. However, the pattern of the modifying element 220 differs because the modifying element 220 blocks the light on both ends 120, 130 and does not block any light in a point along the light pipe 110 where there is a maximum amount of light loss. The point of maximum light loss is approximately the middle point between the two light sources 140, 440; however, depending on the type of light sources the point of maximum light loss can vary. For example, if light source 140 emits light with a longer wavelength than light source 440, then the point of maximum light loss will be closer to light source 440 than light source 140, due to the efficiency of the longer wavelength light emitted from light source 140.

In another alternate embodiment, a thin sheet thermoformed material can be placed in an injection molder and molded to a particular shape so that a light pipe 110 can be placed behind the thermoformed material. In a preferred embodiment, the thermoformed material is a polycarbonate (Sojitz-Manufacturing, Model No. MPIM3236) which gives the appearance of a chrome material when the light pipe 110 is not illuminated. The thermoformed material is a semi-transparent material so that when the light source 180 is illuminated the light will project through the thermoformed material giving the appearance of even light distribution throughout the light pipe 110.

However, the light source 140 behind the thermoformed material can be altered by any of the embodiments described above in order to give the appearance of even light distribution. Thus, the surface of the light pipe 110 can have a gradient, or a secondary lens with a gradient can be applied over a portion or all of the light pipe 110. Furthermore, the thermoformed material can be constructed so that the density of the material alters along the length of the light pipe 110. Thus, the area of the thermoformed material that is most dense will be closest to the light source 140 in order to block or lengthen other areas of the light pipe 110 where the natural light loss is greater.

Therefore, in all of the embodiments described above, a standard light pipe is used, such that no internal modifications are made to the light pipe 110. Thus, the appearance of even light distribution along the length of the light pipe 110 is created by exterior modifications to the light pipe 110 or modifications to other objects separate from the light pipe 110.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A light pipe assembly comprising:
   a light pipe, wherein said light pipe has at least one transmission region;
   a first light source optically connected to said at least one transmission region at a first end of said light pipe; and,
   at least one modifying element optically connected to said light pipe, wherein said modifying element at least partially blocks exposure of said light pipe on a first portion of said light pipe that has a greater light intensity than on a second portion of said light pipe that has a lower light intensity than said first portion, such that said modifying element creates an appearance of even light distribution along said light pipe, wherein said modifying element includes a modification on a surface of said light pipe which is formed by at least one of etching, laser cut, ink printing, pad printing, a thermoformed film, and screen printing.

2. The light pipe assembly of claim 1, wherein said modifying element is more dense on said first portion than said second portion.

3. The light pipe assembly of claim 2, further comprising a second light source optically connected to said at least one transmission region at a second end of said light pipe, wherein said modifying element is more dense on said first and second ends than an intermediate part of said light pipe where the light intensity is reduced.

4. The light pipe assembly of claim 1, wherein said modifying element is a gradient.

5. The light pipe assembly of claim 1, wherein said modifying element includes a sheath that at least partially encapsulates said light pipe.

6. The light pipe assembly of claim 5, wherein said sheath has gradient variances.

7. The light pipe assembly of claim 5, further comprising a second light source optically connected to said at least one transmission region at a second end of said light pipe, wherein aid modifying element is more dense on said first and second ends than an intermediate part of said light pipe where the light intensity is reduced.

8. The light pipe assembly of claim 1, wherein said modifying element includes a lens wit gradient variances that covers at least a portion of said light pipe.

9. The light pipe assembly of claim 1, further comprising a second light source optically connected to a second end of said light pipe.

10. The light pipe assembly of claim 1, further comprising a second light source optically connected to a second transmission region.

11. The light pipe assembly of claim 10, wherein said first transmission region is arranged on a center axis of said light pipe, and said second transmission region is arranged off of said center axis.

12. The light pipe assembly of claim 1, wherein said modifying clement includes a substrate in which said light pipe is imbedded in said substrate at varying depths so that said first portion of said light pipe is at a greater depth than said second portion of said light pipe.

13. The light pipe assembly of claim 1, wherein said modifying element has a slot that varies in width, said light pipe being disposed at least partially within said slot, such that said slot is smaller at said first portion than at said second portion, said slot exposing less of said light pipe at said first portion than said second portion.

14. The light pipe assembly of claim 13, further comprising a second light source optically connected to said at least one transmission region at a second end of said light pipe, wherein said slot is narrower at said first and second ends and wider at an intermediate part of said light pipe where the light intensity is reduced.

15. A light pipe assembly comprising:
a light pipe, wherein said light pipe has at least one transmission region;
at least one light source optically connected to said at least one transmission region at a first end of said light pipe;
at least one modifying element optically connected to said light pipe; and
at least one gradient that forms said modifying element, wherein said at least one gradient is formed by imperfections on a surface of said modifying element which are more dense on a first portion of said light pipe that has the greatest light intensity than a second portion that has a lower light intensity than said first end, such that said modifying element blocks a portion of light from said light source at said first end which creates an appearance of even light distribution in said light pipe.

16. The light pipe assembly of claim 15, wherein said modifying element is a modification on a surface of said light pipe which is formed by at least one of etching, laser cut, pad printing, ink printing, and screen printing.

17. The light pipe assembly of claim 15, wherein said modifying element is a sheath having gradient variances.

18. The light pipe assembly of claim 15, wherein said modifying element is a lens with gradient variances that covers at least a portion of said light pipe.

19. The light pipe assembly of claim 15, further comprising a second light source optically connected to a second end of said light pipe, wherein said modifying element is more dense on said first end and said second end than at an intermediate part of said light pipe.

20. A light pipe assembly comprising:
a light pipe, wherein said light pipe has at least one transmission region;
at least one light source optically connected to said at least one transmission region at a first end of said light pipe;
at least one modifying element optically connected to said light pipe; and,
a substrate, wherein said light pipe is at least partially imbedded in said substrate such that said substrate blocks more light at a first portion of said light pipe that has a greater light intensity than a second portion of said light pipe that has a lower light intensity than said first portion, such that said substrate creates an appearance of even light distribution along said light pipe.

21. The light pipe assembly of claim 20, wherein said first portion is at a greater depth in said substrate than said second portion.

22. The light pipe assembly of claim 20, wherein a plurality of light sources are optically connected to either end of said light pipe, and said ends of said light pipe are at a greater depth than the remaining portions of said light pipe.

23. The light pipe assembly of claim 20, wherein said light pipe is encapsulated in said substrate and said substrate forming a slot that varies in width, such that at said first portion of said light pipe said slot has a smaller width and increases to a greater width at a second end for providing the appearance of even light distribution along said light pipe.

24. The light pipe assembly of claim 23 further comprising a first light source optically connected to a first end of said light pipe and a second light source optically connected to a second end of said light pipe, wherein the width of said slot is narrower at said first end and said second end than at an intermediate part of said light pipe where the light intensity is reduced.

* * * * *

UNITED STATES PATENT AND TRADEMARK OFFICE
CERTIFICATE OF CORRECTION

PATENT NO. : 7,389,020 B2　　　　　　　　　　　　　　　　　　　　　　　　　Page 1 of 1
APPLICATION NO. : 11/321236
DATED : June 17, 2008
INVENTOR(S) : Mark E. Dixon It is certified that error appears in the above-identified patent and that said Letters Patent is hereby corrected as shown below:

In Claim 8, Column 11, Line 33, please replace "wit" with --with--.

Signed and Sealed this

Twenty-first Day of October, 2008

JON W. DUDAS
*Director of the United States Patent and Trademark Office*